United States Patent [19]

Joannou

[11] Patent Number: 5,103,155

[45] Date of Patent: Apr. 7, 1992

[54] BATTERY CHARGING CABLE SYSTEM

[76] Inventor: Constantinos J. Joannou, 49 Mill Street, #4, Carleton Place, Ontario, Canada, K7C 1T6

[21] Appl. No.: 619,951

[22] Filed: Nov. 30, 1990

[51] Int. Cl.⁵ .............................................. H02J 7/00
[52] U.S. Cl. ........................................ 320/26; 320/25
[58] Field of Search ..................................... 320/25, 26

[56] References Cited

U.S. PATENT DOCUMENTS

| | | | |
|---|---|---|---|
| 3,118,101 | 1/1964 | Arber | 320/26 |
| 3,217,225 | 11/1965 | Gottlieb et al. | 320/25 |
| 3,267,301 | 12/1963 | Gignac | 320/26 |
| 3,593,101 | 7/1971 | Wassink | 320/25 |
| 3,700,999 | 10/1972 | Gourse | 320/26 |
| 4,027,223 | 5/1977 | Renz | 320/25 |
| 4,272,142 | 6/1981 | Brown et al. | 320/25 |
| 4,400,658 | 8/1983 | Yates | 320/26 |
| 4,423,456 | 12/1983 | Zaidenweber | 320/25 |
| 4,527,111 | 7/1985 | Branham | 320/26 |
| 4,740,740 | 4/1988 | Taranto et al. | 320/26 |
| 4,855,662 | 8/1989 | Yang | 320/25 |
| 4,871,957 | 10/1989 | Taranto et al. | 320/26 |
| 4,876,496 | 10/1989 | Duncan | 320/25 |
| 4,972,135 | 11/1990 | Bates et al. | 320/25 |
| 4,994,727 | 2/1991 | Yang | 320/26 |

FOREIGN PATENT DOCUMENTS

| | | | |
|---|---|---|---|
| 0297175 | 1/1989 | European Pat. Off. | 320/26 |
| 0328353 | 10/1920 | Fed. Rep. of Germany | 320/26 |
| 3408657 | 9/1985 | Fed. Rep. of Germany | 320/25 |
| 0443796 | 9/1985 | U.S.S.R. | 320/25 |
| 1270799 | 3/1972 | United Kingdom | 320/25 |

Primary Examiner—Steven L. Stephan
Assistant Examiner—Thomas M. Dougherty
Attorney, Agent, or Firm—Jones, Tullar & Cooper

[57] ABSTRACT

A battery charging system is disclosed including an electronic polarity sensing, monitoring and alarm circuit and a special polarity reversing relay connected between two pairs of booster cables. When one of the pairs of cables is connected to a voltage source and the other pair of cables is connected to a battery to be charged, the circuit and relay automatically connect the source and battery with the correct polarity, even if the battery being charged has a very low voltage across it. The circuit also includes an automatic reset feature which resets the relay to a neutral or off position when either of the pairs of cables is disconnected from a voltage source or battery.

22 Claims, 6 Drawing Sheets

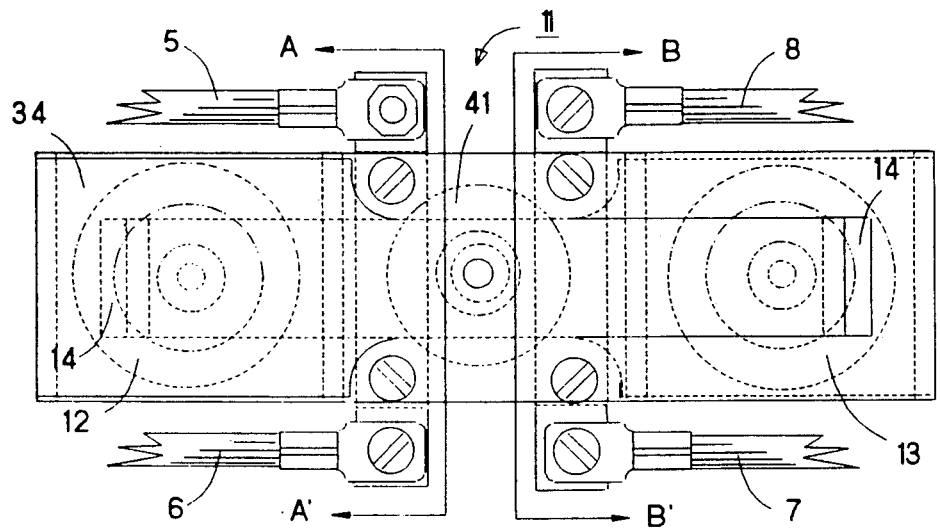
FIG. 4a
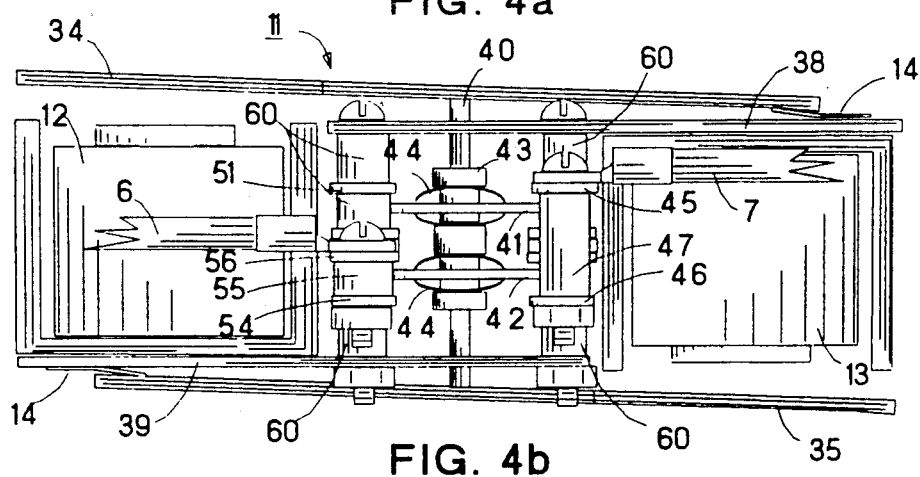
FIG. 4b
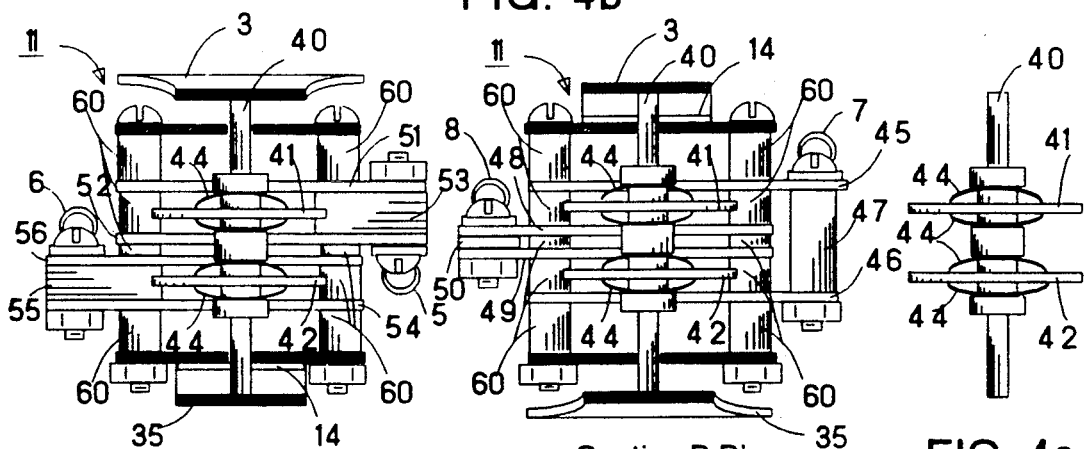
Section A A'
FIG. 4c
Section B B'
FIG. 4d
FIG. 4e

BATTERY CHARGING CABLE SYSTEM

BACKGROUND OF THE INVENTION

In the automotive field, or where there is a need for charging an empty battery from a charged one, a pair of cables, commonly known as booster cables, are used. These cables are provided with two pairs of clamps for connection from one battery to the other. In making the connection however, there is a chance that an inexperienced person may connect the batteries with the wrong polarity and cause damage either to the batteries, to the cables or to his person because of excessive current passing through the cables.

In the prior art and, in particular, in U.S. Pat. No. 4,400,658 to Yates, the problem is stated but the solutions provided are not practical. In the device disclosed in the above patent, there is no provision for sensing the polarity of a very empty battery having only millivolts of potential across its terminals. Also, three position polar relays are described in the above patent that are impractical because such relays cannot be made to switch heavy currents which is a requirement for this application. Furthermore, in the device disclosed in the above patent, there is no provision for automatic disconnect of the cables after removal from the battery being charged and no monitoring and alarm circuits.

SUMMARY OF THE INVENTION

In view of the foregoing, it is the object of the present invention to provide an improved battery charging cable system where, regardless of the way the system is connected, it automatically adjusts for correct polarity, even if the battery being charged has very low voltage across it.

It is yet another object of the invention to provide a battery charging system in which there are monitoring and alarm circuits to warn the operator of any failure of the system.

A further object of the invention is to provide a battery charging cable system which, when the cables are removed from the battery being charged, disconnects power to the cables thus eliminating the danger of either reconnecting the cables to the battery with the wrong polarity or of a short circuit if the disconnected cables contact one another.

Yet another object of the invention is to provide a battery charging cable system with a special reversing relay which provides high contact pressure with minimum actuating coil current and which can be easily connected to the cables.

These and other objects of the invention are achieved through provision of two pairs of booster cables having a polarity controller interposed therebetween which includes a polarity sensing circuit and a reversing relay operated by the sensing circuit. The sensing circuit includes a differential amplifier circuit which is electrically connected to the booster cables to be attached to a battery to be charged. The sensitivity of the differential amplifier circuit is high so that even a very small voltage across a battery to be charged can be detected thereby. Thus, the polarity of even a virtually dead battery can be determined by the sensing circuit.

The differential amplifier circuit is connected to, and controls, the reversing relay which is interposed between the two pairs of booster cables and acts to switch the connections of the cables depending on the sensed polarity of the connections to a battery to be charged.

Also provided in the polarity sensing circuit is a voltage or current responsive means for automatically resetting or disabling the reversing relay when the booster cables are disconnected either from the supply voltage or from the battery to be charged. This insures that the relay will not be improperly set if the cables are reconnected to either the supply voltage or the battery to be charged, and further insures that if the disconnected cable clamps touch one another, a short circuit will not occur.

A further feature of the present invention is an alarm and monitoring circuit which provides a visual and/or audible indication if the reversing relay does not automatically reset to its neutral or off position when the cables are disconnected from either the supply voltage or the battery to be charged. Thus, if the relay contacts fuse together or the circuitry in the polarity sensing circuit malfunctions, the alarm and monitoring circuit will indicate this condition so that a user will not attempt to reconnect the cables to a source of voltage or battery to be charged and thereby risk damage or injury as a result of a short circuit.

The reversing relay of the present invention is specifically designed with a high current carrying capacity and includes a pair of movable contacts, and two sets of stationary contacts. Depending on the polarity sensed by the sensing circuit, one or the other of the relay actuating coils is activated, which causes the movable contacts to move in one of two directions and contact one of the two sets of stationary contacts to connect the two pairs of booster cables in the correct polarity. Spring elements are employed to maintain the movable contacts in a non-contacting neutral or off position when neither of the coils are activated to insure that a short circuit cannot occur when only one end of the cables are connected to a battery or other source of voltage. Further, the relay is constructed so that it has an inherent mechanical advantage which multiplies the force applied by either of the activating coils to the movable contacts and thereby insures positive activation of the relay.

BRIEF DESCRIPTION OF THE DRAWINGS

The foregoing and additional objects, features and advantages of the present invention will become apparent from the following detailed description of preferred embodiments thereof, taken in conjunction with the accompanying drawings in which:

FIG. 4a is a top view of a reversing relay employed in the preferred embodiments of the invention showing parts of the relay in phantom;

FIG. 4b is a front view of the relay of FIG. 4a;

FIG. 4c is a sectional side view of the relay taken along line A—A of FIG. 4a;

FIG. 4d is a sectional side view of the relay taken along line B—B of FIG. 4a; and FIG. 4e is a front elevation view of a movable contact assembly of the relay.

DETAILED DESCRIPTION OF THE PREFERRED EMBODIMENTS

Figure 1:
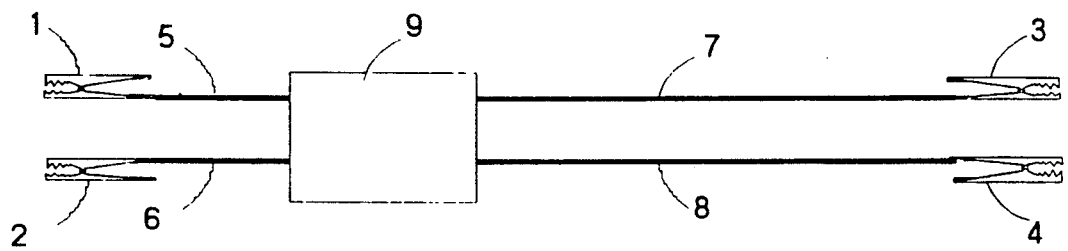
FIG. 1 is an overall block diagram showing the battery charging cable system of a preferred embodiment of the present invention.
Figure 2:
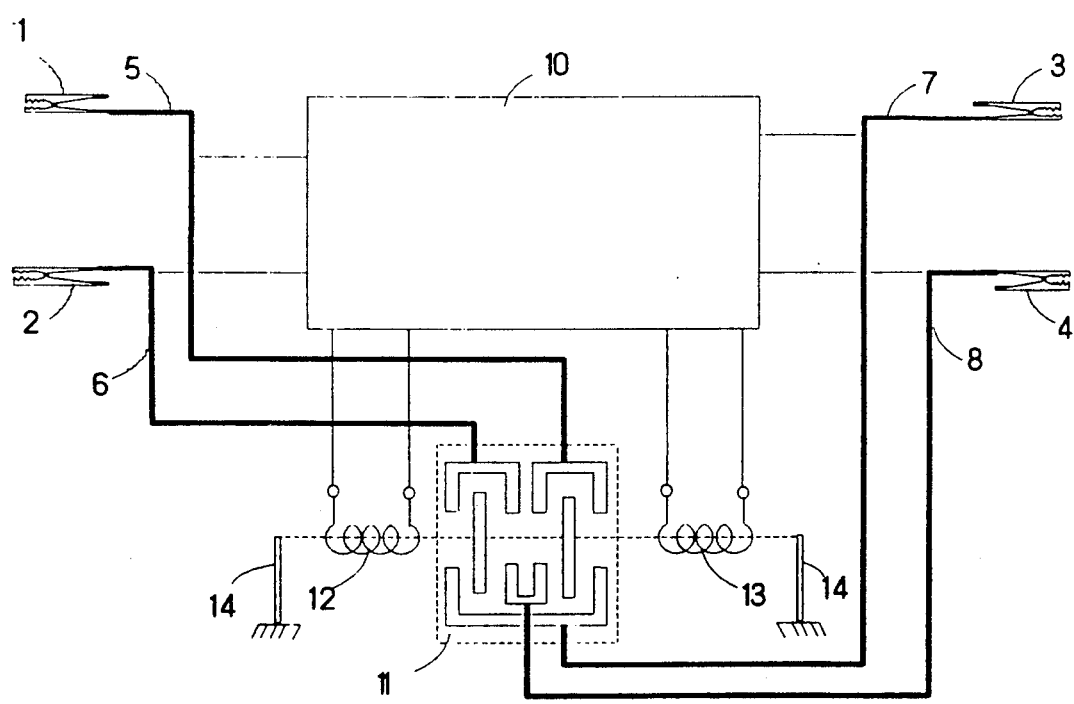
FIG. 2 is a block diagram showing he battery charging cable system of FIG. 1 in greater detail.

Turning now to a more detailed consideration of the present invention, FIGS. 1 and 2 illustrate a plurality of conventional battery terminal clamps 1–4 attached to a plurality of corresponding booster cables 5–8, respectively. A polarity controller 9 is electrically connected between the cables 5 and 7 and also between the cables 6 and 8 as best illustrated in FIG. 2.

The polarity controller 9 includes a polarity sensing and relay control circuit 10 and a reversing relay 11. First and second relay coils 12 and 13 are electrically connected to the circuit 10 and cause selective activation of movable contacts in the relay 11 to either electrically connect cable 5 to cable 7 and cable 6 to cable 8, or cable 5 to cable 8 and cable 6 to cable 7, depending on the polarity sensed by the circuit 10 as discussed in further detail below. A pair of springs 14 are graphically depicted in FIG. 2 which act to maintain the movable contacts of the relay in a non-contacting neutral or off position when energizing voltage is not supplied to either of the coils 12 or 13.

The operation of the charging cable system can be described in broad terms by referring to FIG. 2. Clamps 1 and 2 are connected to a charged battery or any other source of power (not shown), while clamps 3 and 4 are connected to a battery to be charged (also not shown). The sensing and control circuit 10 senses the polarity at cables 5 and 6 and the polarity at cables 7 and 8, and energizes the appropriate relay coil 12 or 13 so that relay 11 connects the positive terminal of the source to the positive terminal of the battery to be charged and the negative terminal of the source to the negative terminal of the battery to be charged.

Figure 3A:
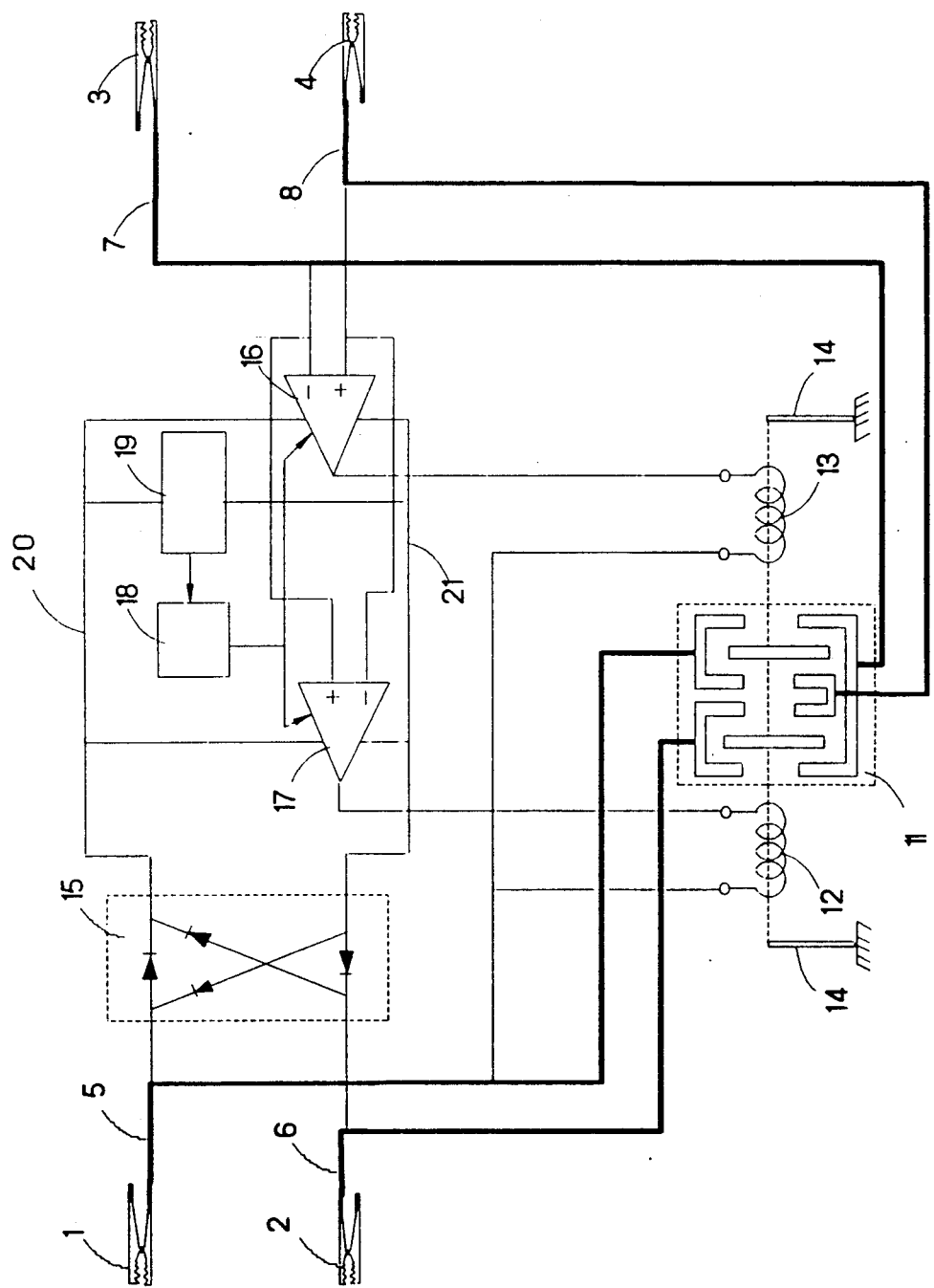
FIG. 3a is a still further detailed drawing of the system of FIG. 1 showing a first preferred embodiment of a control circuit therefore.

To explain in greater detail how the above operation is achieved, reference is made to FIG. 3a. 15 is a full wave rectifier which, when the system is connected to the source via clamps 1 and 2, regardless of polarity, will produce a positive voltage on a wire 20 with respect to a wire 21. Wires 20 and 21 form the DC supply lines for the rest of the sensing and control circuit 10. 16 is a differential amplifier which produces no output until a predetermined differential voltage appears at its input terminals which are connected to cables 7 and 8. Amplifier 16 also has a tristate output, i.e., when its input differential voltage is below a certain level, its output is floating. 17 is another differential amplifier with the same characteristics as amplifier 16 but with its input polarity reversed. 18 is an electronic pulse generator which produces a pulse every few seconds. This pulse is applied to amplifiers 16 and 17 and, during this pulse, amplifiers 16 and 17 go into their tristate or floating mode. 19 is a voltage sensor which senses the voltage across supply lines 20 and 21 and produces an output signal which is connected to pulse generator 18. When the supply voltage drops below a certain value, sensor 19 produces a signal which disables pulse generator 18.

In more detail, operation of the battery charging cable system is as follows. Clamps 1 and 2 are connected to a charged battery or a DC power source (in case of a service truck this may be a permanent connection to the truck's batteries). Regardless of the polarity at cables 5 and 6, full wave rectifier 15 will provide a positive voltage on supply line 20 with respect to supply line 21. These two supply lines power amplifiers 16 and 17 and pulse generator 18. Before clamps 3 and 4 are connected to the battery to be charged, the input terminals of amplifiers 16 and 17 have zero volts impressed on them and therefore, their outputs are floating (in tristate mode), hence, coils 12 and 13 are not energized. When clamps 3 and 4 are connected to a battery to be charged, and if the battery to be charged has at least a small amount of voltage across its terminals (50 to 100 millivolts for instance), amplifiers 16 and 17 will produce output voltages of opposite polarity: i.e., if amplifier 16 produces a positive voltage at its output terminal, amplifier 17 produces a negative voltage or vice versa depending on the polarity across the battery terminals (note that the two amplifiers have opposite signs at their inputs).

Now, which relay coil will be energized depends on the polarity of the charging source at clamps 1 and 2. To clarify the operation further, consider the case where clamp 1 is positive, clamp 2 is negative, clamp 3 is negative and clamp 4 is positive. In this case, amplifier 16 will have a positive output and amplifier 17 will have a negative output. Considering the polarity at clamps 1 and 2, coil 13 will have both of its terminals at the same positive potential and therefore it will not be energized, while coil 12 will have one of its terminals at positive voltage (clamp 1) and its other terminal at negative voltage (output of amplifier 17), and it will be energized. Energizing coil 12 will cause the movable contacts of relay 11 to be moved to the left and connect clamp 1 to clamp 4 via cables 5 and 8 and clamp 2 to clamp 3 via cables 6 and 7; i.e., clamp which is sensed to be positive, will connect to clamp 4, which is also sensed to be positive; clamp 2, which is sensed to be negative, will connect to clamp 3, which is sensed to be negative.

Now if clamp 3 is connected to the positive terminal of a battery to be charged and clamp 4 is connected to the negative terminal, by the same reasoning as before, coil 13 will now be energized pulling the movable contacts of relay 11 to the right and thus connecting clamp 1 to clamp 3 and clamp 2 to clamp 4. In either case the two batteries will be connected correctly. It is easy to see from the above that even if the assumed polarity of clamps 1 and 2 is reversed, the relay will operate in such a way as to still make the correct connections.

After disconnecting the battery being charged from the cables, it is important to reset the system in its original state, i.e., set the relay in its off or neutral position and thus disconnect the output side of the cables from the input side. In this way, if the output side is reconnected to the battery, the system will make the right connections automatically again as before. One method of achieving this is as shown in FIG. 3a. In particular, the pulse generator 18 and the voltage sensor 19 serve this function and operate as follows. While charging a battery, at normal current, the pulse generator 18 keeps interrupting the power to the relay coils 12 or 13 by applying pulses to amplifiers 16 and 17. The interruptions are of short duration; for example, 10 percent of the on time. If clamps 3 and 4 are disconnected from the battery being charged, at the first interruption thereafter, the relay 11 will reset to the off position and, because there is no longer voltage at clamps 3 and 4, the relay 11 will not be re-energized and will remain off or open circuited. When a battery is being charged and someone tries to start the vehicle serviced by the battery, the starter will draw a heavy current and the voltage across the cables will drop. During this time, the voltage sensor 19 will sense the lower voltage and prevent the pulse generator 18 from interrupting the relay 11. This prevents the switching of heavy currents which may cause burnout of the relay contacts.

Figure 3C:
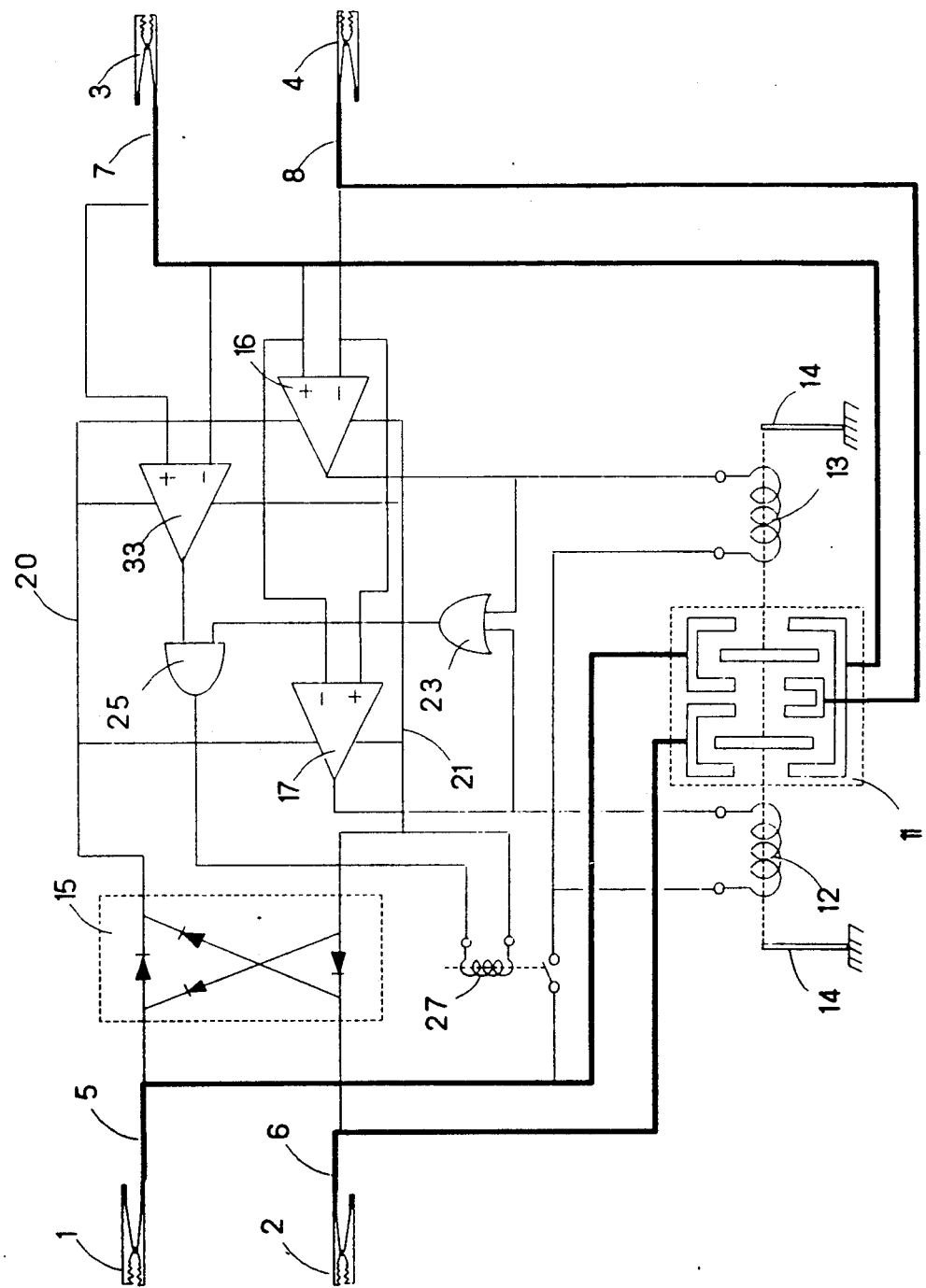
FIG. 3c shows a third preferred embodiment of the control circuit for the system.
Figure 3C:
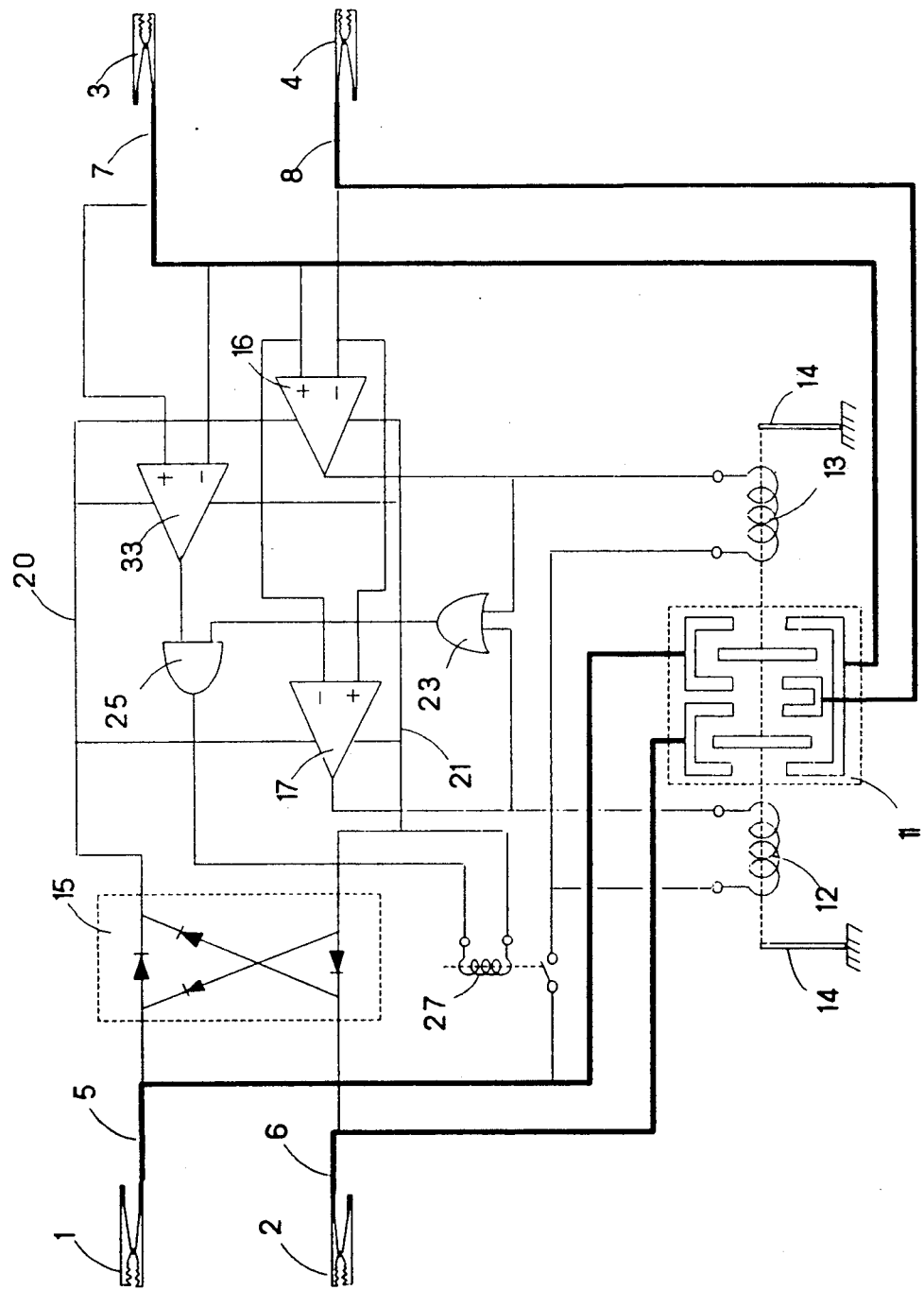
Figure 3D:
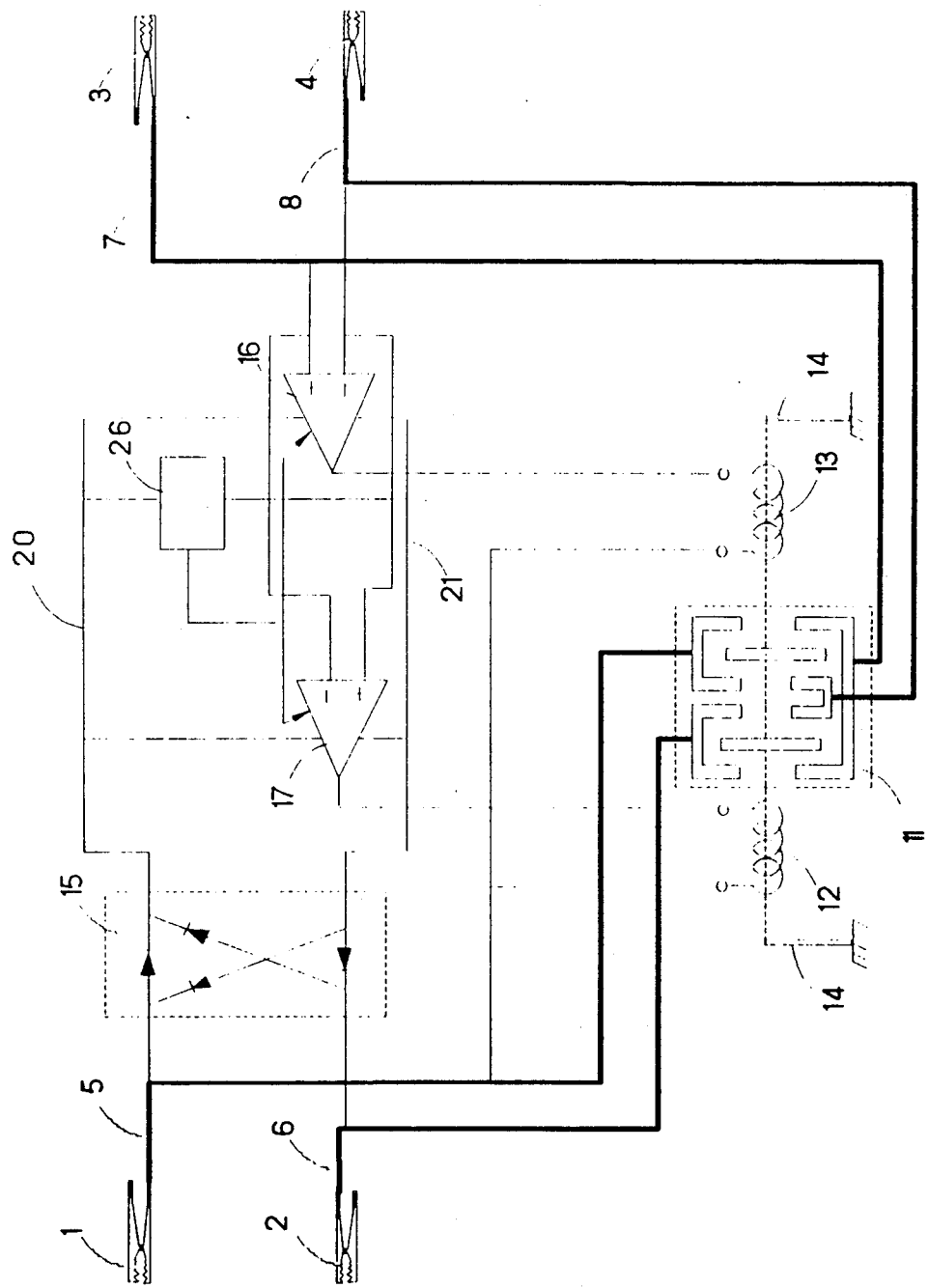
FIG. 3d shows a fourth preferred embodiment of the control circuit for the system.
Figure 3B:
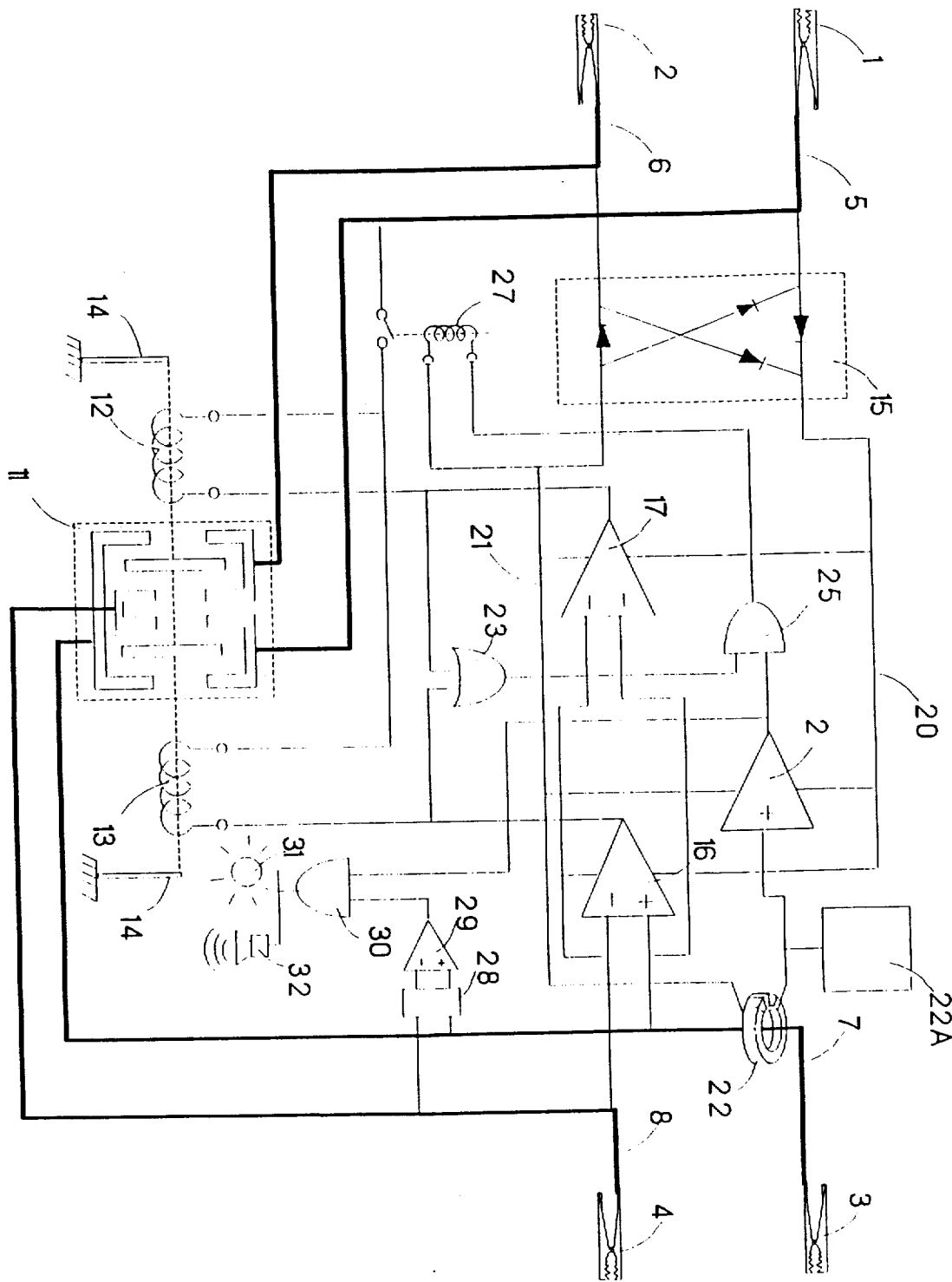
FIG. 3b is similar to FIG. 3a and shows a second preferred embodiment of the control circuit for the system.

An alternative arrangement for resetting the system after disconnection of a source or battery to be charged is illustrated in FIG. 3b. A saturable magnetic core 22 encircles the cable 7 and is employed to sense current flowing therethrough. An electronic oscillator 22A provides oscillating current in a winding of the core 22 which in turn generates an oscillating voltage across the winding that is fed to an amplifier 24. The amplifier 24 produces a binary high level output voltage when the oscillating voltage at its input is high. A two input OR gate 23 has its inputs connected to the relay coils 12 and 13 and produces a binary high-level output voltage when either of its inputs are high. The outputs of the amplifier 24 and OR gate 23 are fed as inputs to a two input AND gate 25, the output of which is connected to a relay 27 which, when energized, disconnects one side of relay coils 12 and 13 from the cable 5, thereby resetting the relay 11 to its neutral or off position.

Operation of the current sensing scheme of the embodiment illustrated in FIG. 3b is as follows. If clamps 1 and 2 are connected to a source, there is no current in cable 7, the oscillatory voltage across the winding of coil 22 is high, the output of amplifier 24 is high, the output of OR gate 23 is low (no coils ar energized), the output of AND gate 25 is low since one of its inputs is low and, therefore, coils 12 and 13 are connected to cable 5.

The next step is to connect clamps 3 and 4 to a battery to be charged. Under this condition, the sensing amplifiers 16 and 17 will energize the appropriate relay coil and the relay 11 will connect the source and the battery to be charged correctly and current will flow through the cables including cable 7. During this phase of operation, the oscillatory voltage across the winding of core 22 will drop because of saturation of the core due to the current in cable 7. This causes the output of amplifier 24 to go low, and the output of AND gate 25 will remain low, thus keeping relay 27 de-energized. When clamps 3 and 4 are eventually removed from the battery being charged, then, current in cable 7 will stop flowing, the oscillatory voltage across the winding of core 22 will increase to its highest output, and the output of amplifier 24 will go high. Now the AND gate 25 has two high inputs and therefore its output will go high and energize relay 27, thus de-energizing relay coils 12 or 13. When this happens, the voltage across cables 7 and 8 will drop to zero and amplifiers 16 and 17 will have zero output. The output of the AND gate 25 will go to zero, releasing relay 27, and thus the system is reset.

Monitoring and alarm circuits are also provided in the embodiment shown in FIG. 3b. These include a full wave rectifier 28, amplifier 29, AND gate 30, visual alarm (light) 31 and audio alarm 32. In general, the alarms 31 and 32 will be activated when there is no current in the cables but, at the same time, there is voltage across the cables 7 and 8. This condition will exist when either amplifier 16 or 17 have an output high or the relay contacts are fused together. Rectifier 28 rectifies the voltage across cables 7 and 8 and its DC output is fed to differential amplifier 29. Thus amplifier 29 will have a binary high output when there is voltage of any polarity across cables 7 and 8. AND gate 30 has one input connected to amplifier 29 and one to amplifier 24. The output of gate 30 operates alarms 31 and 32.

In the operation of the monitoring and alarm circuit, if there is no current in cable 7, amplifier 24 has a high output. If there is voltage across cables 7 and 8, amplifier 29 also has a high output. Therefore, gate 30 has a high output, and alarms 31 and 32 will be activated to indicate that the relay contacts remain closed in spite of the fact that the clamps 3 and 4 have been disconnected from a battery to be charged, and therefore no current is flowing through cable 7.

Yet another way of resetting the system after the battery to be charged is disconnected from the booster cables is to use a different current sensing scheme as is illustrated in FIG. 3c. In this scheme, the very small voltage developed across the cable is sensed by a single differential amplifier 33. Amplifier 33 is a high gain amplifier having its two inputs connected either across a part of cable 7 as shown or across the whole length of cable 7 or even across a shunt (not shown). Amplifier 33 amplifies the small voltage developed across the portion of the cable 7 which is between its two input terminals, and produces a digital low output regardless of the polarity at its input. The voltage out of amplifier 33 takes the place of the voltage produced by amplifier 24 (FIG. 3b) and the operation of the scheme becomes identical to the scheme illustrated in FIG. 3b.

A still further scheme for resetting the system is shown in FIG. 3d. Here 26 is a voltage sensor which senses and amplifies any change of voltage in the positive direction and provides a positive pulse to amplifiers 16 and 17 which sets them in their tristate mode momentarily. Operation of this scheme is very simple. When the battery being charged is disconnected, the voltage across supply lines 20 and 21 will increase slightly because of the unloading of the source. Voltage sensor 26 detects the upward change in voltage, produces a positive pulse and de-energizes relay coils 12 or 13, thus resetting the relay 11 to its neutral or off position. After the duration of the pulse, the relay will stay in its neutral or off position since there will not be any voltage across cables 7 and 8.

A preferred embodiment of the structure of the reversing relay 11 is illustrated in FIGS. 4a–e. In FIG. 4b, 34 and 35 are armatures for the relay coils 12 and 13, respectively. The leaf springs 14 are employed to connect the armature 34 to a relay base plate 38, and the armature 35 to a relay base plate 39.

As illustrated in FIGS. 4c–e, 40 is a movable shaft on which are mounted, first and second flat disc shaped contacts 41 and 42, by means of an insulator body 43 and a plurality of spring washers 44. The insulator body 43 holds the contacts 41 and 42 apart and electrically insulates them from one another, while the springs 44 provide resilience for the contacts 41 and 42.

A first pair of flat strip contacts 45 and 46 are electrically connected together by a first conducting spacer 47, and are also electrically connected to the cable 7. A second pair of flat strip contacts 48 and 49 are electrically connected together by a second conducting spacer 50, and are also electrically connected to the cable 8. A third pair of flat strip contacts 51 and 52 are connected together by a third conducting spacer 53, and are also electrically connected to the cable 5. Finally, a fourth pair of flat strip contacts 54 and 56 are electrically connected together by a fourth conducting spacer 55, and are also electrically connected to the cable 6. A plurality of insulators 60 are employed to electrically insulate the various contacts and spacers from one another.

In the operation of the reversing relay 11, when relay coil 12 is energized, the magnetic field produced thereby attracts armature 34 and the gap between armature 34 and coil 12 closes. Movable relay contacts 41 and 42 are pushed downward via shaft 40, so that contact 41 connects contact 48 with contact 52, thus providing electrical connection between cable 8 and cable 5. At the same time, contact 42 connects contact 46 with contact 54, thus providing electrical connection between cable 7 and cable 6.

When relay coil 13 is energized, the magnetic field produced thereby attracts armature 35, and the movable relay contacts 41 and 42 are pushed upward via shaft 40 so that contact 41 connects contact 45 with contact 51, thus providing electrical connection between cable 7 and cable 5. At the same time, contact 42 connects contact 49 with contact 56, thus providing electrical connection between cable 8 and cable 6.

Thus, given a polarity between cables 5 and 6, the polarity between cables 7 and 8 depends on which of the relay coils 12 or 13 is energized. Note that leaf spring elements 14 force armatures 34 and 35 to work against each other and when neither of the coils 12 or 13 are energized, the movable relay contacts 41 and 42 are centered between the various stationary contacts so that no connection is made between cables 5, 6, 7, or 8. This is the neutral or off position of the relay 11 and is an advantage when a battery is charged from a source because if clamps 3 and 4 are accidentally touched together before being connected to the battery to be charged, no short circuit will occur.

Another advantage of this relay construction is that there are no flexing wires. Most common relays depend on flexing wires for their operation and because of the heavy currents involved in charging batteries, heavy gauge wires are used which are very difficult to flex. Yet another advantage of the relay construction illustrated in FIGS. 4a–e is that it has an inherent mechanical advantage. The force produced by the magnetic attraction at the coils 12 and 13 is multiplied, due to leverage, by about a factor of 2 at the middle of the armatures 34 and 35 where the movable shaft 40 is located. Therefore, the force pressing the various contacts together is greater for a given current in the relay coils 12 and 13 than if the mechanical advantage was not implemented. Finally, as can be seen best in FIG. 4a, each of the cables 5–8 are attached to their respective terminals on the relay 11 in such a manner that the cables are not bent at any sharp angles. This is an important consideration since booster cables are typically very heavy gauge and are therefore difficult to bend.

Although the present invention has been disclosed in terms of preferred embodiments, it will be understood that numerous variations and modifications could be made thereto without departing from the spirit and scope of the invention as defined in the following claims.

I claim:

1. A battery charging cable system comprising:
   a) first and second cables each having first and second ends;
   b) means disposed at the first ends of said first and second cables to connect said first and second cables electrically to a first source of DC voltage;
   c) third and fourth cables each having first and second ends;
   d) means disposed at the first ends of said third and fourth cables to connect said third and fourth cables electrically to a second source of DC voltage, such as a battery to be charged;
   e) a polarity reversing relay connected to the second ends of said first, second, third and fourth cables for electrically connecting said second ends of said first and second cables selectively to said second ends of said third and fourth cables; said relay being actuable to at least a first position in which said first cable is electrically connected to said third cable and said second cable is electrically connected to said fourth cable; said relay being actuable to at least a second position in which said first cable is electrically connected to said fourth cable, and said second cable is electrically connected to said third cable; said reversing relay being normally biased to a third, neutral position in which no electrical connections are made between any of said cables; and,
   f) a polarity sensing and relay control circuit electrically connected to said first, second, third and fourth cables, said circuit including;
      i) first and second differential amplifiers, said first differential amplifier having a positive input connected to said third cable and a negative input connected to said fourth cable, and said second differential amplifier having a negative input connected to said third cable and a positive input connected to said fourth cable, such that said first differential amplifier generates a positive voltage output when a positive voltage is present across said third and fourth cables and generates a negative voltage output when a negative voltage is present across said third and fourth cables; and, said second differential amplifier generates a negative voltage output when a positive voltage is present across said third and fourth cables, and generates a positive voltage output when a negative voltage is present across said third and fourth cables; and,
      (ii) reversing relay actuating means electrically connected to the outputs of said first and second differential amplifiers and said first cable for actuating said relay either to said first position or said second position depending on the polarity of a voltage across said third and fourth cables relative to the polarity of said first cable;
   whereby, when said first and second cables are connected to a first source of DC voltage and said third and fourth cables are connected to a second source of DC voltage, said reversing relay will be automatically actuated to either said first or second position so that the correct polarity is maintained between the first and second DC voltage sources.

2. The battery charging cable system of claim 1 wherein said reversing relay actuating means comprises:
   i) a first relay coil for actuating said reversing relay to said first position, said first relay coil being electrically connected between said first cable and the output of said second differential amplifier; and, ii) a second relay coil for actuating said reversing relay to said second position, said second relay coil being electrically connected between said first cable and the output of said first differential amplifier;

whereby, said reversing relay will be actuated to either said first or second position when voltages are present both across said third and fourth cables and across said first and second cables, depending on the polarity of the voltage across said third and fourth cables relative to the polarity of the voltage across said first and second cables.

3. The battery charging cable system of claim 2 wherein said polarity sensing and relay control circuit further includes means to inhibit said first and second differential amplifiers to cause them to generate floating outputs periodically, regardless of the presence of a voltage across aid third and fourth cables, so that power to said first and second relay coils will be periodically interrupted thereby causing said reversing relay to return to said third, neutral position periodically;

whereby, if said third and fourth cables are disconnected from a second source of voltage while said first and second cables remain connected to a first source of voltage, said reversing relay will be caused to return to its third, neutral position.

4. The battery charging cable system of claim 3 further including means to disable said means to inhibit, said means to disable being electrically connected to said first and second cables, and responsive to a sensed low voltage across said first and second cables, whereby, said reversing relay will not be caused to return to said third, neutral position periodically if the voltage across said first and second cables drops due to a heavy current draw therethrough.

5. The battery charging cable system of claim 4 wherein said means to inhibit comprises a pulse generator connected to a disabling input on each said first and second differential amplifiers.

6. The battery charging cable system of claim 2 wherein said polarity sensing and relay control circuit further includes means to inhibit said first and second differential amplifiers to cause them to generate floating outputs, regardless of the presence of a voltage across said third and fourth cables, so that power to said first and second relay coils will be interrupted thereby causing said reversing relay to return to said third, neutral position; said means to inhibit being responsive to an increase in voltage across said first and second cables which occurs when said third and fourth cables are removed from a second source of voltage to be charged while said first and second cables remain connected to a first source of voltage.

7. The battery charging cable system of claim 2 further including means to disable said first and second relay coils when a voltage is present across said third and fourth cables but no current is flowing through said third cable.

8. The battery charging cable system of claim 7 wherein said means to disable comprises:

a disconnect relay connected between said first cable and said first and second relay coils; and, a disconnect relay control circuit connected to the outputs of said first and second differential amplifiers and a current sensing means for sensing current through said third cable; said disconnect relay control circuit being operable to actuate said disconnect relay when no current is sensed by said current sensing means but either of said differential amplifiers generates an output which indicates that a voltage is present across said third and fourth cables.

9. The battery charging cable system of claim 8 wherein said disconnect relay control circuit further comprises:

an OR gate having a first input connected to the output of said first differential amplifier and a second input connected to the output of said second differential amplifier;

an AND gate having a first input connected to an output of said OR gate and a second input connected to said current sensing means which generates a high input to said AND gate when no current is sensed flowing through said third cable, said AND gate having a output connected to said disconnect relay;

whereby, said disconnect relay is actuated to disconnect said first and second relay coils from said first cable when a voltage is present across said third and fourth cables and no current is flowing through said third cable.

10. The battery charging cable system of claim 9 wherein said current sensing means comprises a saturable core and associated coil disposed thereon which encircles said third cable.

11. The battery charging cable system of claim 9 wherein said current sensing means comprises a high sensitivity differential amplifier having a first input connected to said third cable at a first position along the length thereof and a second input connected to said third cable at a second position spaced from said first position whereby, said high sensitivity differential amplifier generates an output which is responsive to a sensed voltage differential along said third cable between said first position and said second position due to the flow of current therethrough.

12. A battery charging cable system comprising:

a) first and second cables each having first and second ends;

b) means disposed at the first ends of said first and second cables to connect said first and second cables electrically to a first source of DC voltage;

c) third and fourth cables each having first and second ends;

d) means disposed at the first ends of said third and fourth cables to connect said third and fourth cables electrically to a second source of DC voltage, such as a battery to be charged;

e) a polarity reversing relay connected to the second ends of said first, second, third and fourth cables for electrically connecting said second ends of said first and second cables selectively to said second ends of said third and fourth cables; said relay being actuable to at least a first position in which said first cable is electrically connected to said third cable and said second cable is electrically connected to said fourth cable; said relay being actuable to at least a second position in which said first cable is electrically connected to said fourth cable, and said second cable is electrically connected to said third cable; said reversing relay being normally biased to a third, neutral position in which no electrical connections are made between any of said cables; and, f) a polarity sensing and relay control circuit electrically connected to said first, second, third and fourth cables, said circuit including;
  (i) means to sense the polarity of a voltage across said third and fourth cables and generate an output which varies in response to the sensed polarity, said means to sense being capable of sensing a very small voltage;
  (ii) reversing relay actuating means electrically connected to said output of said means to sense and said first cable for actuating said relay either to said first position or said second position depending on the polarity of a voltage across said third and fourth cables relative to the polarity of said first cable; and
  (iii) means to inhibit periodically the means to sense the polarity of a voltage across said third and fourth cables from generating an output thereby periodically inhibiting said reversing relay actuating means so that if said third and fourth cables are disconnected from a source of voltage while said first and second cables remain connected to another source of voltage, said reversing relay will return to its third, neutral position;
  whereby, when said first and second cables are connected to a first source of DC voltage and said third and fourth cables are connected to a second source of DC voltage, said reversing relay will be automatically actuated to either said first or second position so that the correct polarity is maintained between the first and second DC voltage sources.

13. The battery charging cable system of claim 12 further including means to disable said means to inhibit electrically connected to said first and second cables, said means to disable being responsive to a sensed low voltage across said first and second cables,
  whereby, said reversing relay will not be caused to return to its third, neutral position periodically if the voltage across said first and second cables drops due to a heavy current draw therethrough.

14. The battery charging cable system of claim 13 wherein said means to inhibit comprises a pulse generator connected to a disabling input of said means to sense the polarity of a voltage across said third and fourth cables.

15. A battery charging cable system comprising:
  a) first and second cables each having first and second ends;
  b) means disposed at the first ends of said first and second cables to connect said first and second cables electrically to a first source of DC voltage;
  c) third and fourth cables each having first and second ends;
  d) means disposed at the first ends of said third and fourth cables to connect said third and fourth cables electrically to a second source of DC voltage, such as a battery to be charged;
  e) a polarity reversing relay connected to the second ends of said first, second, third and fourth cables for electrically connecting said second ends of said first and second cables selectively to said second ends of said third and fourth cables; said relay being actuable to at least a first position in which said first cable is electrically connected to said third cable and said second cable is electrically connected to said fourth cable; said relay being actuable to at least a second position in which said first cable is electrically connected to said fourth cable, and said second cable is electrically connected to said third cable; said reversing relay being normally biased to a third, neutral position in which no electrical connections are made between any of said cables; and,
  f) a polarity sensing and relay control circuit electrically connected to said first, second, third and fourth cables, said circuit including:
    (i) means to sense the polarity of a voltage across said third and fourth cables and generate an output which varies in response to the sensed polarity, said means to sense being capable of sensing a very small voltage;
    (ii) reversing relay actuating means electrically connected to said output of said means to sense and said first cable for actuating said relay either to said first position or said second position depending on the polarity of a voltage across said third and fourth cables relative to the polarity of said first cable; and
    (iii) means to inhibit said reversing relay actuating means when no current flows through said third cable;
  whereby, when said first and second cables are connected to a first source of DC voltage and said third and fourth cables are connected to a second source of DC voltage, said reversing relay will be automatically actuated to either said first or second position so that the correct polarity is maintained between the first and second DC voltage sources; and
  whereby, if said third and fourth cables are disconnected from a second source of voltage while said first and second cables remain connected to a first source of voltage, said reversing relay will be caused to return to its third, neutral position.

16. The battery charging cable system of claim 15 wherein said means to inhibit comprises:
  current sensing means for sensing current through said third cable;
  a disconnect relay connected between said first cable and said reversing relay actuating means; and,
  a disconnect relay control circuit connected to said disconnect relay, said means to sense the polarity of a voltage across said third and fourth cables and said current sensing means; said disconnect relay control circuit operable to actuate said disconnect relay and thereby inhibit said reversing relay actuating means when a voltage is present across said third and fourth cables but no current is flowing through said third cable.

17. The battery charging cable system of claim 16 wherein said current sensing means comprises a saturable core and an associated winding disposed thereon encircling said third cable.

18. The battery charging cable system of claim 16 wherein said current sensing means comprises a high sensitivity differential amplifier having a first input connected to said third cable at a first position along the length of said first cable, and a second input connected to said third cable at a second position spaced from said first position whereby, said differential amplifier generates an output which is responsive to a sensed voltage differential along said third cable between said first position and said second position due to the flow of current therethrough.

19. A battery charging cable system comprising:

a) first and second cables each having first and second ends;
b) means disposed at the first ends of said first and second cables to connect said first and second cables electrically to a first source of DC voltage;
c) third and fourth cables each having first and second ends;
d) means disposed at the first ends of said third and fourth cables to connect said third and fourth cables electrically to a second source of DC voltage, such as a battery to be charged;
e) a polarity reversing relay connected to the second ends of said first, second, third and fourth cables for electrically connecting said second ends of said first and second cables selectively to said second ends of said third and fourth cables; said relay being actuable to at least a first position in which said first cable is electrically connected to said third cable and said second cable is electrically connected to said fourth cable; and said relay being actuable to at least a second position in which said first cable is electrically connected to said fourth cable, and said second cable is electrically connected to said third cable; said polarity reversing relay comprising:
  i) first and second relay actuating coils;
  ii) a moveable contact shaft having disposed thereon first and second movable contacts;
  iii) a first movable armature engaging a first end of said moveable contact shaft for moving said shaft in a first direction, said first moveable armature being moveable upon actuation of said first relay coil;
  iv) a second movable armature engaging a second end of said moveable shaft for moving said shaft in a second, opposite direction, said second armature being moveable by actuation of said second coil;
  v) first, second, third and fourth stationary contacts each being electrically connected to a corresponding one of said first, second, third and fourth cables and being positioned adjacent said moveable contact shaft such that when said shaft moves in said first direction, said first moveable contact will electrically connect said first stationary contact to said third stationary contact thereby electrically connecting said first cable to said third cable, and said second moveable contact will electrically connect said second stationary contact to said fourth stationary contact thereby electrically connecting said second cable to said fourth cable;
  vi) fifth, sixth, seventh and eighth stationary contacts each connected to a corresponding one of said first, second, third and fourth cables, said fifth, sixth, seventh and eighth stationary contacts being positioned adjacent said moveable shaft such that when said moveable shaft moves in said second direction, said first moveable contact will electrically connect fifth stationary contact to said eighth stationary contact, thereby electrically connecting said first cable to said fourth cable, and said second moveable contact will electrically connect said sixth stationary contact to said seventh stationary contact, thereby electrically connecting said second cable to said third cable; and,
  vii) biasing means to hold said moveable shaft in a neutral position where said moveable contacts do not contact any of said stationary contacts when neither of said relay coils are actuated; and,
f) a polarity sensing and relay control circuit electrically connected to said first, second, third and fourth cables, said circuit including;
  (i) means to sense the polarity of a voltage across said third and fourth cables and generate an output which varies in response to the sensed polarity, said means to sense being capable of sensing a very small voltage; and,
  (ii) reversing relay actuating means electrically connected to said output of said means to sense and said first cable for actuating said relay either to said first position or said second position depending on the polarity of a voltage across said third and fourth cables relative to the polarity of said first cable;
whereby, when said first and second cables are connected to a first source of DC voltage and said third and fourth cables are connected to a second source of DC voltage, said revering relay will be automatically actuated to either said first or second position so that the correct polarity is maintained between the first and second DC voltage sources.

20. The battery charging cable system of claim 19 wherein said first and second armatures provide force multiplication between said first and second relay coils and said moveable shaft.

21. A battery charging cable system comprising:
a) first and second cables each having first and second ends;
means disposed at the first ends of said first and second cables to connect said first and second cables electrically to a first source of DC voltage;
c) third and fourth cables each having first and second ends;
d) means disposed at the first ends of said third and fourth cables to connect said third and fourth cables electrically to a second source of DC voltage, such as a battery to be charged;
e) a polarity reversing relay connected to the second ends of said first, second, third and fourth cables for electrically connecting said second ends of said first and second cables selectively to said second ends of said third and fourth cables; said relay being actuable to at least a first position in which said first cable is electrically connected to said third cable and said second cable is electrically connected to said fourth cable; said relay being actuable to at least a second position in which said first cable is electrically connected to said fourth cable, and said second cable is electrically connected to said third cable;
f) a polarity sensing and relay control circuit electrically connected to said first, second, third and fourth cables, said circuit including;
  (i) means to sense the polarity of a voltage across said third and fourth cables and generate an output which varies in response to the sensed polarity, said means to sense being capable of sensing a very small voltage; and,
  (ii) reversing relay actuating means electrically connected to said output of said means to sense and said first cable for actuating said relay either to said first position or said second position depending on the polarity of a voltage across said third and fourth cables relative to the polarity of said first cable;

g) current sensing means to sense current flow through said third cable; and, h) an alarm circuit connected to said current sensing means and across said third and fourth cables for providing an alarm when a voltage is present across said third and fourth cables but no current is flowing through said third cable;

whereby, when said first and second cables are connected to a first source of DC voltage and said third and fourth cables are connected to a second source of DC voltage, said reversing relay will be automatically actuated to either said first or second position so that the correct polarity is maintained between the first and second DC voltage sources; and whereby, said alarm circuit will be activated when said third and fourth cables are not connected to a source of voltage, but said reversing relay remains either in said first or second positions.

22. A battery charging cable system comprising:

a) first and second cables each having first and second ends;

b) means disposed at the first ends of said first and second cables to connect said first and second cables electrically to a first source of DC voltage;

c) third and fourth cables each having first and second ends;

d) means disposed at the first ends of said third and fourth cables to connect said third and fourth cables electrically to a second source of DC voltage, such as a battery to be charged;

e) a polarity reversing relay connected to the second ends of said first, second, third and fourth cables for electrically connecting said second ends of said first and second cables selectively to said second ends of said third and fourth cables; said relay being actuable to at least a first position in which said first cable is electrically connected to said third cable and said second cable is electrically connected to said fourth cable; said relay being actuable to at least a second position in which said first cable is electrically connected to said fourth cable, and said second cable is electrically connected to said third cable; said reversing relay being normally biased to a third, neutral position in which no electrical connections are made between any of said cables; and, f) a polarity sensing and relay control circuit electrically connected to said first, second, third and fourth cables, said circuit including;

(i) means to sense the polarity of a voltage across said third and fourth cables and generate an output which varies in response to the sensed polarity, said means to sense being capable of sensing a very small voltage;

(ii) reversing relay actuating means electrically connected to said output of said means to sense and said first cable for actuating said relay either to said first position or said second position depending on the polarity of a voltage across said third and fourth cables relative to the polarity of said first cable; and, (iii) means to disable said reversing relay actuating means and thereby cause said reversing relay to return to its third, neutral position, said means to disable being responsive to a sensed increase in voltage across said first and second cables which occurs when said third and fourth cables are disconnected from a second source of voltage to be charged while said first and second cables remain connected to a first source of voltage;

whereby, when said first and second cables are connected to a first source of DC voltage and said third and fourth cables are connected to a second source of DC voltage, said reversing relay will be automatically actuated to either said first or second position so that the correct polarity is maintained between the first and second DC voltage sources.

* * * * *

UNITED STATES PATENT AND TRADEMARK OFFICE
CERTIFICATE OF CORRECTION

PATENT NO. : 5,103,155

DATED : Apr. 7, 1992

INVENTOR(S) : Constantinos J. Joannou

It is certified that error appears in the above-identified patent and that said Letters Patent is hereby corrected as shown below:

In the Drawings:

Fig. 3c, on Drawing Sheet 3 of 6, should be deleted and substitute therefor Fig. 3b, as shown on the attached page.

Signed and Sealed this

Twenty-third Day of February, 1993

*Attest:*

STEPHEN G. KUNIN

*Attesting Officer*     *Acting Commissioner of Patents and Trademarks*